United States Patent [15] 3,638,327
Levy et al. [45] Feb. 1, 1972

[54] PROCESS FOR PRODUCING ALUMINUM CHLORHYDROXIDES

[72] Inventors: Edward F. Levy, Newtonville; Roy H. Karlson, Newton; Ursula E. Hornig, Jamaica Plain, all of Mass.

[73] Assignee: The Gillette Company, Boston, Mass.

[22] Filed: Apr. 17, 1969

[21] Appl. No.: 817,153

[52] U.S. Cl..................................34/5, 424/47, 424/68, 23/50 R
[51] Int. Cl..........................................F26b 5/06
[58] Field of Search......................23/50, 52, 3, 5, 294, 305; 34/5

[56] References Cited

UNITED STATES PATENTS

| | | | |
|---|---|---|---|
| 2,876,163 | 3/1959 | Garizo et al. | 23/52 X |
| 3,476,509 | 11/1969 | Jones | 23/50 |
| 3,523,129 | 8/1970 | Holbert et al. | 23/50 R |
| 3,523,153 | 8/1970 | Holbert et al. | 23/50 R |
| 2,813,350 | 11/1957 | Berger | 34/5 |
| 3,440,732 | 4/1969 | Chiola et al. | 34/5 |
| 3,452,445 | 7/1969 | Higgins | 34/5 |

Primary Examiner—Herbert T. Carter
Attorney—Philip Colman, Oistein J. Bratlie and William M. Anderson

[57] ABSTRACT

The present invention is concerned with novel aluminum chlorhydroxides which have substantially improved solubility in alcohols and with processes for preparing such chlorhydroxides. Generally, the chlorhydroxides of the present invention are produced by freeze drying aluminum chlorhydroxides from aqueous solutions.

2 Claims, No Drawings

PROCESS FOR PRODUCING ALUMINUM CHLORHYDROXIDES

SUMMARY OF INVENTION

For quite some time, aluminum chlorhydroxides have been widely used as antiperspirants. Generally the chlorhydroxides which have been found particularly useful for this purpose are polymeric in nature and of unknown molecular weight and may be represented by the empirical formula:

I. $Al_2(OH)_y Cl_{(6-y)}$ wherein $y$ is a number which is greater than 4 and less than 6. They are formed from various proportions of $AlCl_3$, $Al(OH)Cl_2$, $Al(OH)_2Cl$ and $Al(OH)_3$ and $y$ in the formula need not be a whole number. As examples of chlorhydroxides within formula I mention may be made of: $Al_2(OH)_{4.5}Cl_{1.5}$; $Al_2(OH)_5Cl$ and $Al_2(OH)_{5.5}Cl_{0.5}$. Generally, the chlorhydroxides within the formula are soluble in water but are insoluble in organic solvents such as ethyl alcohol. Accordingly, when they are used as anitperspirants, they have to be used in aqueous systems or as dispersions in organic systems. In the past, such chlorhydroxides have been rendered alcohol soluble by condensing them with mono and polyhydroxy alcohols to form organo-complexes.

One object of the present invention is to provide aluminum chlorhydroxide complexes which have substantially improved solubility in alcohols and especially ethyl alcohol.

Another object of the present invention is to provide processes for producing such complexes.

Still another object of the present invention is to provide astringent compositions comprising the alcohol soluble aluminum chlorhydroxide complexes.

Other objects of the invention will be clear from the following detailed description and claims.

In the present invention it has been found that if aluminum chlorhydroxides within the above formula I are freeze dried from aqueous solutions, the resulting products are soluble in alcohols such as ethyl alcohol. The results are quite unexpected in that normally if such chlorhydroxides are isolated from aqueous solutions by evaporating the water therefrom, without freeze drying, they are substantially insoluble in alcohols.

The aluminum chlorhydroxides for use in the processes of the present invention are commercially available or they may be prepared by methods such as disclosed in U.S. Pat. Nos. 2,196,016; 2,392,153 and 2,392,531. The processes of this invention have been found to be particularly useful with chlorhydroxides having the empirical formula—$Al_2(OH)_5Cl$.

In carrying out the processes of the present invention, any of the well-known freeze-drying methods may be employed. Generally, the processes comprise freezing the aqueous solutions of the aluminum chlorhydroxide complexes and then subliming the water therefrom under vacuum. For economic reasons, it is desirable to start with solutions which are as close to the saturation point as possible. Especially good results have been obtained using solutions which contain about 50 percent by weight of the aluminum chlorhydroxide. More dilute solutions, e.g., 10 percent by weight, may be employed but it will be appreciated they make the process much less economical.

The following nonlimiting example illustrates the processes of the present invention:

EXAMPLE 1

One hundred grams of a 50 percent by weight aqueous solution of $Al_2(OH)_5Cl \cdot 2H_2O$ was placed in a 1-liter, round bottom flask and the flask was rapidly twirled in an ethanol-Dry Ice bath ($-60°$ C.) until the solution froze in a shell around the inner surface of the flask. Before thawing set in, the flask was connected to a port in the cover of a 3-liter resin kettle which was immersed in a butyl carbitol-Dry Ice bath. The cover of the kettle was also connected to a two-arm distillation head, one arm of which was connected to a McLeod gauge and the other arm of which was connected to a line running to a vacuum pump. The line to the vacuum pump was fitted with a three-way regulating stop-cock, a cold finger trap and a manometer. When the flask was in place, the vacuum pump was turned on and a vacuum of about $200\mu$ Hg. was pulled. In about 3 minutes sublimation began and the process was continued until frost ceased forming on the outer surface of the flask. Three hundred milliliters of anhydrous ethanol was then added to the flask and it was agitated for several hours until complete solution took place. An assay of the solution showed the following:

| | % (by weight) | Method used |
|---|---|---|
| $H_2O$ | 3.5 to 3.9% | Karl Fischer |
| $Al_2(OH)_5Cl$ (anhydrous) | 13.8 to 14.2% | Chloride ion determination |

As evidenced by their solubility (up to about 20 percent by weight in alcohol) the aluminum chlorhydroxide complexes of the present invention are substantially different from the complexes heretofore known and are new compositions of matter.

The aluminum chlorhydroxide complexes produced herein are useful as antiperspirants and particularly as antiperspirants in ethyl alcohol solutions intended for use in aerosol compositions. Such aerosol compositions generally comprise an alcoholic solution of the antiperspirant, a suitable propellant and, if desired, other materials such as bactericides, emollients, etc. An especially useful class of propellants which are used in such systems are the fluoro- and fluorochloro-substituted alkanes comprising one to four carbon atoms and more particularly one to two carbon atoms. Examples of useful propellants of this type are dichlorodifluoromethane, dichlorotetrafluoroethane, monofluorotrichloromethane and mixtures of these materials with one another. A typical aerosol antiperspirant composition would generally contain about 2 to 15 percent of the antiperspirant.

Having thus described our invention, what is claimed is:

1. A process for producing alcohol-soluble aluminum chlorhydroxides from alcohol-insoluble aluminum chlorhydroxides within the empirical formula:

$$Al_2(OH)_y Cl_{(6-y)}$$

wherein $y$ is a number which is greater than 4 and less than 6; said process comprising freeze drying an aqueous solution of said alcohol-insoluble aluminum chlorhydroxide to thereby produce said alcohol-soluble aluminum chlorhydroxide.

2. A process as defined in claim 1 wherein $y$ is 5.

* * * * *